3,473,626
AIR ESCAPE VALVE FOR CONTROLLING AIR COMPRESSOR OUTPUT PRESSURE
Tadahide Toda and Masanori Hanaoka, Toyota-shi, and Taro Yamaguchi, Kariya-shi, Japan, assignors to Nippon Denso Company, Ltd. and Toyota Motor Co., Ltd., both of Aichi-ken, Japan, both corporations of Japan
Filed Sept. 20, 1966, Ser. No. 580,808
Claims priority, application Japan, Aug. 30, 1966, 41/81,835, 41/81,836
Int. Cl. F01n 3/06
U.S. Cl. 181—37            4 Claims

ABSTRACT OF THE DISCLOSURE

A pressure relief valve for permitting the escape of air from an air compressor is described by way of a single embodiment. The principal feature of the valve is that it will operate substantially without noise.

The valve includes a valve body portion having a cavity in the head thereof for receiving sound damping material and having a conduit portion extending outwardly from the body and terminating in an air discharge. Immediately below the head portion there is provided a valve extension which is flanged to the body and which includes an opening having a valve seat on the interior which is adapted to be closed by a valve member arranged on the interior of the extension and biased downwardly by a spring member. A valve cover is disposed between the extension and the valve body and it is provided with openings for the passage of air upwardly from the inlet of the extension to the head portion and then laterally out the tubular discharge.

BRIEF SUMMARY OF THE INVENTION

This invention relates to a compressor output pressure control valve and more particularly to an air escape valve for an air compressor for use in connection with an exhaust gas control device in automotive vehicles, said exhaust gas control device being adapted to effect a complete combustion of the material in the gases exhausted by the cylinders of an internal combustion engine by the supply of air into the exhaust pipe immediately at the back of the exhaust valve by means of said air compressor driven by said engine. It is well known that the optimum quantity of air for controlling air pollution from automotive exhaust gases does not increase in proportion to the number of revolutions of the engine, but a slight increase of the quantity of air is sufficient for this purpose when the number of revolutions exceeds a certain value. On the other hand the discharge volume of the air compressor increases nearly in proportion to the number of revolutions of the engine, as the air compressor is driven by the engine under a definite speed ratio. Therefore, an air escape valve must be arranged, preferably at the discharge side of the air compressor, in order to allow excess discharge air to escape when said number of revolutions exceeds a certain value, which also saves the driving power of the air compressor.

Such an air escape valve as heretofore used comprises a valve plate and a valve seat, both being made of metal and coming into contact with each other. However, this type of valve has the disadvantage that its valve plate will intermittently beat against the valve seat due to the pulsing motion of the excess discharge air when the valve plate begins to open or a slight opening of the valve is maintained. As a result, an intensive metallic noise, especially of the intermediate frequency band, occurs. In addition, such valves have another disadvantage inasmuch as they produce a considerably intensive noise due to the squeezing action on the air flow in its opening condition of operation which noise is mainly of the high frequency band.

With the foregoing in mind, the primary object of the present invention is the provision of a novel air escape valve for an air compressor adapted to cooperate with an exhaust gas control device by which said intensive metallic noise is prevented.

Another object of this invention is the provision of an escape valve in which both said metallic and said air flow noise is so prevented that the sound pressure of the noise is considerably decreased over all the frequency bands. Other objects and features of the invention will become apparent as the descrciption proceeds, especially when taken in conjunction with the accompanying drawings, illustrating a preferred embodiment of the invention, wherein.

Figure 1:
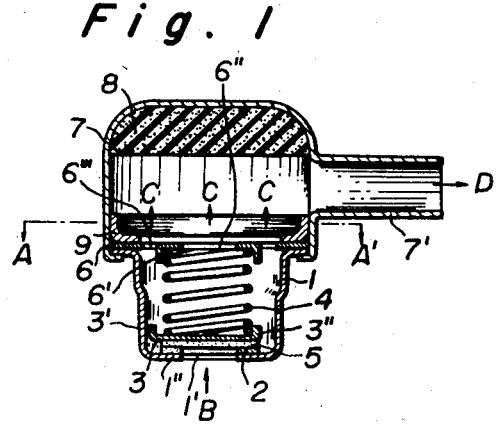
FIGURE 1 is a longitudinal section taken through the air escape valve according to this invention.
Figure 2:
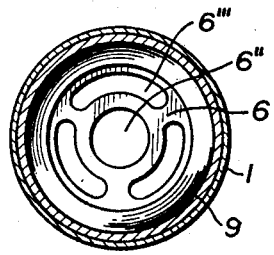
FIGURE 2 is a transverse section indicated by line A–A' on FIGURE 1.
Figure 3:
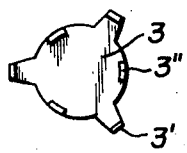
FIGURE 3 is a plan view of the valve plate.

Referring first to FIGURES 1 and 2, the air escape valve illustrated therein has a valve body or extension member 1 provided with an excess discharge air inlet 1' and a valve seat 1" at its lower end. An elastic material 2 having a great resistance to wear, for example polyurethane, is secured to the contact surface of said valve seat 1". A valve plate 3 is forced against said elastic material 2 by a pressure spring 4 interposed between said valve plate 3 and a valve cover 6. As is shown in FIGURE 3, valve plate 3 is provided with the first bent projections 3' serving to guide said valve plate along the inner surface of valve body 1 and the second bent projections 3" adapted to support said pressure spring 4. Another elastic material 5 also having a great resistance to wear, for example polyurethane, is secured to the contact surface of valve plate 3. Valve cover 6 is provided with bent projections 6' which support the pressure spring 4 and with discharge openings 6" and 6''' and permit excess discharge air to flow out. An air chamber or upper body 7 is arranged at the outlet side of said excess discharge air and provided at its backside with a diffuser 7' serving as a muffler. A sound-absorbent material 8, a resinous foaming agent, is rigidly secured to the wall of said air chamber 7. A flange member 9 is fixedly attached to the interior of the air chamber 7 in order to clamp the valve body 1, valve cover 6 and air chamber 7 together. This air escape valve is deposited at the discharge side of an air compressor (not shown). When the engine increases its speed and the discharge pressure of said air compressor exceeds a certain value, valve plate 3 is lifted upwards by the air pressure exerted on said valve plate 3 in the direction of arrow B in opposition to the force of pressure spring 4, and the excess discharge air from the compressor flows into valve body 1 through the excess discharge air inlet 1' (arrow B). The excess air entered in valve body 1 blows off through the discharge openings 6", 6''' of valve cover 6 in the direction of arrow C. The excess air flow tends to produce a noise as it is squeezed while it passes through the excess discharge air inlet 1' and said discharge openings 6", 6'''. The air flow noise is removed from the excess air by the action of the sound-absorbent material 8 secured to air chamber 7 as the air flows upwardly in chamber 7 and out through diffuser 7' in the direction of arrow D.

When the air escape valve begins to open immediately after the discharge pressure of the air compressor exceeds a certain value or during constant engine operation in said condition of the discharge pressure, or when the valve is kept in a slightly opening condition, a vibratory flutter of valve plate 3 is caused by the pulsing of the excess discharge air, so that the excess discharge air inlet 1' is opened and closed repeatedly. In this case valve plate 3 and valve seat 1" do not directly touch each other since the elastic materials 5 and 2 attached to these respective parts prevent metallic contact and the occurrence of metallic noise. It has been found in tests that the apparatus according to this invention, in which polyurethane as said elastic materials 2 and 5 and resinous foaming agents as said sound-absorbent material 8 are used, will reduce the sound pressure of noise approximately 10 db over all of the frequency bands.

About the same effect was obtained when an elastic material was attached to either the valve plate 3 or valve seat 1". In this case only the metallic noise could be prevented and the sound pressure in the intermediate frequency band could be reduced approximately 10 db.

While only one embodiment of the present invention is shown and described, it will be understood by those persons skilled in the art that various modifications of the structuce shown and described may be made without departing from the scope of the present invention.

We claim:

1. A relief valve for an air compressor comprising a tubular valve body having an outlet end and an opposite inlet end with an inlet opening adapted to be connected to the compressor, an interior valve seat defined around the inlet opening, a valve cover extending across said body adjacent said inlet end and having a discharge opening, an upper body defining an air chamber affixed to said valve body over said valve cover and at a spaced location from and in alignment with the discharge opening and said valve seat, said upper body having a laterally extending diffuser conduit for the passage of air, a valve plate over said valve seat, and spring means between said valve plate and said valve cover biasing said valve plate in a direction to close over said valve seat, at least one of said valve plate and said valve seat having an elastic material secured thereto forming a resilient sound-absorbent damper element between said valve plate and said valve seat during the closing and opening thereof.

2. A relief valve, according to claim 1, wherein said upper body includes a lower end with an annular flange portion forming an internal ledge, said valve body having an annular flange engaged over said ledge, a flange member located within said upper body over said annular flange and affixing said cover and said lower body to said upper body, and a sound-absorbing material located within the said air chamber above said diffuser and over said valve cover.

3. A relief valve according to claim 1, including an elastic material secured to each of said valve plate and said valve seat which materials abut when said valve plate is closing said valve seat.

4. A relief valve according to claim 1, wherein said upper valve body includes a cavity having a sound damping material between said valve cover and said diffuser conduit.

References Cited

UNITED STATES PATENTS

| | | | |
|---|---|---|---|
| 874,034 | 12/1907 | Prellwitz | 137—543.19 XR |
| 1,017,536 | 2/1912 | Graydon | 181—36 |
| 1,238,334 | 8/1917 | Raub | 137 543.19 |
| 1,673,619 | 6/1928 | Culp | 251—127 XR |
| 1,737,710 | 12/1929 | Erbach | 137—543.19 |
| 2,136,098 | 11/1938 | Browne. | |
| 2,419,664 | 4/1947 | Tabbert. | |
| 2,974,745 | 3/1961 | Kristiansen | 181—36 XR |
| 3,232,032 | 2/1966 | Pierce. | |
| 3,292,732 | 12/1966 | Webb | 181—37 |

FOREIGN PATENTS

| | | |
|---|---|---|
| 808,634 | 11/1936 | France. |
| 195,483 | 5/1938 | Switzerland. |

ROBERT S. WARD, JR., Primary Examiner

U.S. Cl. X.R.

137—543.19; 181—65; 251—127